United States Patent [19]

Peyrovian

[11] Patent Number: 5,822,677
[45] Date of Patent: Oct. 13, 1998

[54] SHARED HYBRID-FIBER COAX TRANSMISSION SYSTEM HAVING INCREASED BANDWIDTH IN THE UPSTREAM AND DOWNSTREAM DIRECTIONS

[75] Inventor: M. Javad Peyrovian, Monmouth County, N.J.

[73] Assignee: AT&T Corp., Middletown, N.J.

[21] Appl. No.: 697,474

[22] Filed: Aug. 26, 1996

[51] Int. Cl.[6] .................................................. H04N 7/173
[52] U.S. Cl. ............................................. 455/5.1; 348/12
[58] Field of Search .............................. 455/3.1, 4.1, 5.1, 455/6.1, 6.2, 6.3; 348/6, 7, 10, 11, 12, 13; H04N 7/173, 7/16

[56] References Cited

U.S. PATENT DOCUMENTS

| | | | |
|---|---|---|---|
| 5,408,259 | 4/1995 | Warwick | 348/12 |
| 5,499,047 | 3/1996 | Terry et al. | 348/12 |
| 5,528,582 | 6/1996 | Bodeep et al. | 348/12 |
| 5,557,319 | 9/1996 | Gurusami et al. | 348/11 |
| 5,625,865 | 4/1997 | Moehrmann | 348/12 |

*Primary Examiner*—Chris Grant

[57] ABSTRACT

Bandwidth is increased and noise may be reduced in a shared hybrid fiber-coax transmission system (10) by digitally modulating upstream information onto a high frequency band (e.g., 750–1000 MHz) and thereafter digitally regenerating both the high frequency upstream information as well as a portion of the downstream information not used for broadcast video (i.e., the 500–750 MHz band).

6 Claims, 4 Drawing Sheets

SHARED HYBRID-FIBER COAX TRANSMISSION SYSTEM HAVING INCREASED BANDWIDTH IN THE UPSTREAM AND DOWNSTREAM DIRECTIONS

TECHNICAL FIELD

This invention relates to a technique for providing reliable digital transmission, as well as increased bandwidth in both the upstream and downstream directions in a shared hybrid-fiber coax transmission system, as well as in an all-coax transmission system.

BACKGROUND ART

Most existing Cable Television (CATV) systems provide one-way transmission of information (e.g., video signals) from a CATV Head-End to individual subscribers via a network of coaxial cables or a combination of optical fibers and coaxial cables. When these systems are upgraded for two-way transmission, a low frequency band, typically 5–40 MHz, is assigned to upstream signals generated by individual subscribers. In contrast, downstream signals generated by the head end and destined for individual subscribers are assigned a higher frequency band (e.g., 50–750 MHz). Noise measurements in present day cable systems have shown that noise and interference ("noise") are very high in the 5–40 MHz band. There are numerous sources of noise in this frequency band. For example, amateur, citizens band, and mobile radio systems all operate in the 5–40 MHz band and constitute a source of noise. Home appliances also generate noise in the 5–40 MHz band. Although less of a problem, noise can affect downstream signals at very high frequencies as well.

Present day share cable systems aggregate (sum) the upstream signals from individual subscribers for transmission to the head. Such systems also aggregate noise from households passed (HHPS). To assure reliable transmission, the aggregated amount of upstream ("ingress") noise must be reduced. One possible solution is to run fiber closer to the subscriber to reduce the number of total number HHPS per fiber node, thereby reducing the level of aggregated noise. This solution is very costly due to deployment of new fiber nodes and fiber installations. Another solution is to deploy digital repeaters within the coaxial cable distribution network for upstream signals as taught in co-pending U.S. patent application Ser. No. No. 08/650,683, "Shared Hybridfiber-Coax Network Having Reduced Ingress Noise," filed May 20, 1996, and assigned to AT&T Corp. (herein incorporated by reference). While this solution resolves the upstream noise (ingress noise) and interference problem, it does not provide enough bandwidth for high market penetration of broadband services. Nor does it solve the downstream (egress) noise problem or the bandwidth problem if amplifiers are not upgraded.

Another proposed solution is to employ so-called Mini-Fiber-Nodes (mFNs) wherein additional fibers run from the head-end to trunk and line extender amplifier locations in the coaxial cable plant. The mFNs are co-located with the trunk and line extender amplifier locations and employ a relatively inexpensive laser to transmit signals back to the head end. This solution also overcomes the problem of ingress noise by operating in a higher frequency band (750–1000 MHz) as well as the small number of HHPS per mini-fiber node. Further, this solution provides a sufficient amount of bandwidth for the upstream and downstream information. However, the cost of running such fibers is significant.

BRIEF SUMMARY OF THE INVENTION

Briefly, in accordance with a preferred embodiment of the invention, a method is provided for reliable transmission (reduced noise), as well as increased bandwidth in both the upstream and downstream directions in a CATV system. Pursuant to the invention, information originating at the subscriber premises is digitally modulated via a carrier to a high frequency band (typically 750–1000 MHz) that is allocated to for upstream information transmission. The modulated signal is then digitally regenerated by at least one repeater. By the same token, high frequency downstream signals, typically those lying in a frequency band of 500–750 MHz, are also digitally regenerated, allowing this signal band to be used for downstream of signals that would otherwise be degraded by noise. Each repeater, by its nature, will generate an essentially noise-free output signal for transmission if the signal-to-noise ratio of the signals input to the repeaters is adequate which is usually the case. From a noise perspective, deploying repeaters in this manner accomplishes the same effect for upstream as reducing the number of HHPS served by each fiber node, without actually reducing the number of HHPS that are served. Moreover, since the upstream and downstream repeaters operate in a high frequency band, there is sufficient bandwidth for emerging broadband services and high market penetration. This approach of digitally regenerating the upstream and downstream information and modulating the upstream information via a carrier to a high frequency band is applicable to all-coax cable systems as well as hybrid fiber-coax systems.

DETAILED DESCRIPTION

Figure 1:
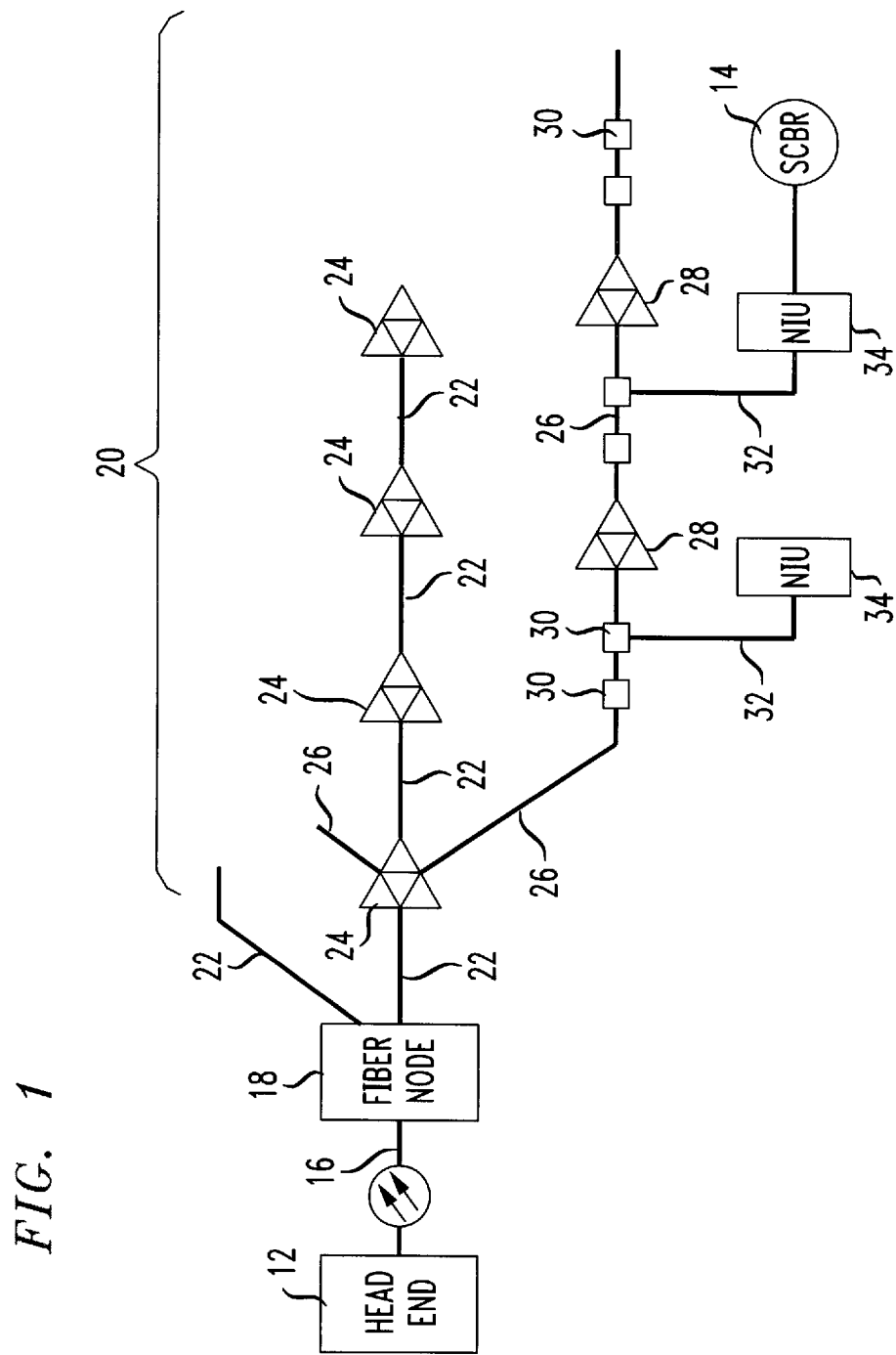
FIG. 1 is a block diagram of a present day shared hybrid fiber-coax transmission system in accordance with the prior art.

FIG. 1 depicts a hybrid-fiber-coax transmission system 10 in accordance with the prior art. The system 10 includes a head end 12 for generating information, e.g., video, audio, multimedia, data and/or text ("downstream signals "); for transmission to individual subscribers 14—14. The head end 12 also receives information, ("upstream signals "), e.g., video, audio, multimedia, data and/or text; generated by one or more of the subscribers 14—14.

In practice, a combination of optical fibers and coaxial cables carry downstream signals from the head end 12 to the subscribers 14—14 and carry the upstream signals from the subscribers to the head end. As seen in FIG. 1, an optical fiber link 16, comprised of an upstream and down stream fibers (not shown), carries both the upstream and downstream signals in an optical format between the head end 12 and a fiber node 18. The fiber node 18 converts the optically-formatted downstream signals received from the head end 12 into electrical signals for distribution via a coaxial cable distribution network 20 to the individual subscribers 14—14. Further, the fiber node 18 converts subscriber-generated upstream signals, received via the coaxial cable distribution network 20, into an optically-formatted signal for transmission to the head end 12.

The cable distribution network 20 has a tree and branch architecture and includes at least one, and typically four coaxial tunk cables 22—22. Each of the trunk cables 22—22 typically has a plurality of branching tunk amplifiers 24—24 cascaded along its length for amplifying the upstream and downstream information. (In practice, each branching trunk amplifiers comprises individual amplifying elements and diplexers (not shown) that separately amplify the upstream and downstream signals.)

Each trunk amplifier 24 feeds one or more distribution cables 26—26. Each distribution cable 26 typically has one or more line extenders 28—28 cascaded along its length for amplifying the upstream and downstream signals carried by each distribution cable. The distribution cables 26—26 each contain a plurality of taps 30—30 via which a connection may be made to each distribution cable. Each tap 30 is connected via a coaxial drop cable 32 to a network interface unit (NIU) 34 through which an individual subscriber 14 receives downstream signals and through which the subscriber transmits upstream signals.

Presently, each NIU 34 formats all of the signals generated by a corresponding subscriber 14 via a carrier onto a low frequency band, typically 5–40 MHz. The low frequency band presently used to carry subscriber-generated upstream signals is relatively narrow and is subject to significant noise from a variety of sources.

Figure 2:
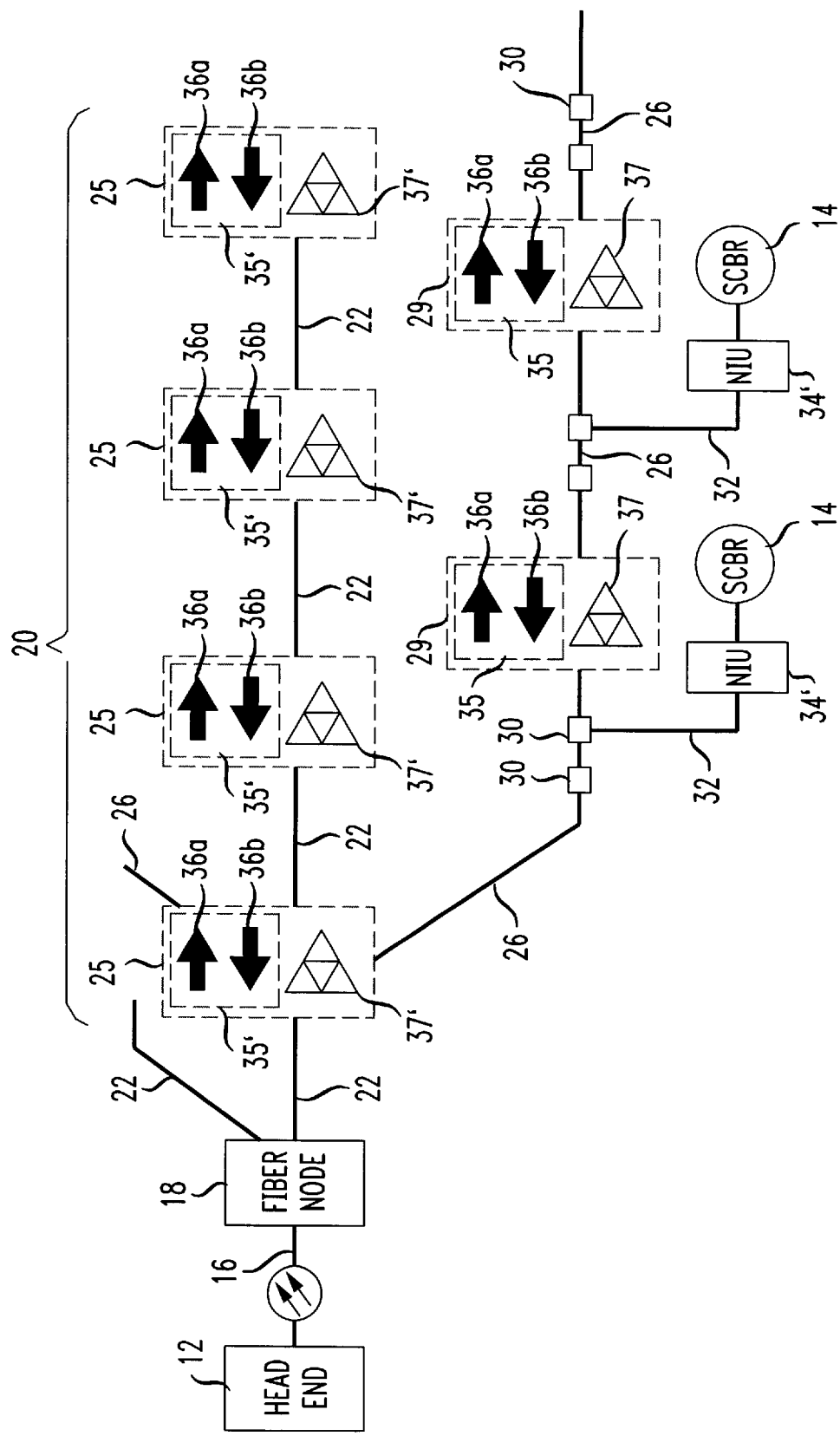
FIG. 2 is a block diagram of a shared hybrid fiber-coax transmission system in accordance with the invention.

FIG. 2 shows a shared hybrid fiber-coax system 100 in accordance with the invention having reduced ingress and egress noise and increased bandwidth. The system 100 of FIG. 2 is similar in many respects to the network of FIG. 1 and like numbers have been used for like elements. However, the network 100 of FIG. 2 does differ from the network of FIG. 1 in several respects. In particular, the network 100 of FIG. 2 includes an NIU 34' in place of the NIU 34 of FIG. 1. Referring to FIG. 2, the NIU 34' operates to interface a corresponding subscriber 14 to an associated tap 30 in much the same way as does the NIU 34 of FIG. 1. However, unlike the NIU 34 of FIG. 1 that operates to modulate all of the upstream signals generated by the corresponding subscriber 14 onto the low frequency band of 5–40 MHz, the NIU 34' of FIG. 3 modulates at least a portion of the upstream subscriber-generated signals via a carrier onto a high frequency band (e.g., 750–1000 MHz), above the band on which the downstream signals are carried.

There are several advantages to modulating at least a portion of the upstream signals via a carrier onto such a high frequency band. First, the high frequency band of 750–1000 MHz lying above the downstream band of 50–750 MHz is typically much less susceptible to noise than the low frequency band of 5–40 MHz that has traditionally been employed to carry the upstream signals. Further, the frequency band of 750–1000 MHz has a much greater bandwidth than the low frequency band of 5–40 MHz.

Additionally, the network 100 of FIG. 2 differs from the network 10 of FIG. 1 by the presence of tunk amplifiers 25—25, each with a regenerator element 35' having separate upstream and downstream regenerators 36a and 36b, and an amplifying element 37', in place of the trunk amplifiers 24—24. Further, the network 100 of FIG. 1 also includes line extenders 29—29, each with a regenerator element 35, having separate upstream and downstream regenerators 36a and 36b, and an amplifying element 37, in place of the line extenders 28—28 of FIG. 1. Note that the amplifiers 24 and 28 of FIG. 1 may be re-used as the amplifying elements 37' and 37, respectively.

Figure 3:
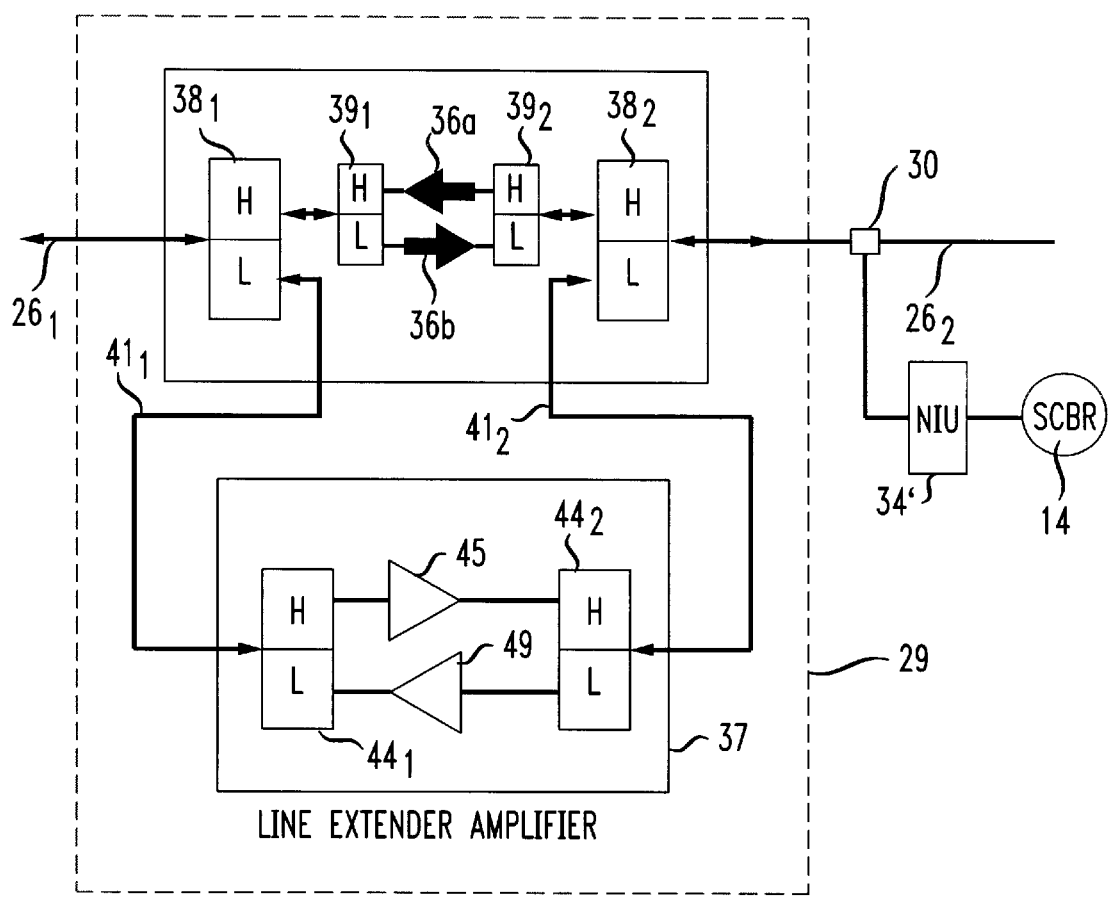
FIG. 3 is a block diagram of a first embodiment of a line extender incorporating upstream and downstream digital repeaters in accordance with the present invention for use with the shared hybrid fiber-coax system of FIG. 2.

FIG. 3 depicts a line extender 29 that may be substituted for one of the line extenders 28—28 of FIG. 1. As seen in FIG. 3, the regenerator element 35 within the line extender 29 comprises a first pair of upstream and downstream diplexers $38_1$ and $38_2$, respectively. The first diplexers $38_1$ and $38_2$ are connected to upstream and downstream distribution cable segments $26_1$ and $26_2$, respectively, representing upstream and downstream portions, respectively, of one of the distribution cables 26—26.

The downstream diplexer $38_2$ separates those signals within a frequency band of 500–1000 MHz from the signals lying in a frequency band of 5–500 MHz. The frequency band of 500–1000 MHz includes the high frequency subscriber-originated upstream signals lying in the 750–1000 MHz band, as well as the downstream information lying in the frequency band of 500–750 MHz. In practice, most CATV systems carry broadcast video signals information for downstream distribution in a frequency band of 50–500 MHz. Thus, the 500–750 MHz portion of the downstream band can be employed for downstream transmission of non-broadcast signals, such as those related to telephony applications.

The signals in the frequency band of 500–1000 MHz separated by the first downstream diplexer $38_2$ pass to a second downstream diplexer $39_2$ that separates signals in the 750–1000 MHz band (representing the subscriber-originated upstream signals) from those in the 500–750 MHz band (representing the higher frequency portion of the downstream signals).

The high frequency upstream signals in the 750–1000 MHz band separated by the diplexer $39_2$ pass to the upstream digital repeater 36a which is configured the same as the digital repeater described in the aforementioned co-pending application Ser. No. 08/650,683 (incorporated by reference herein). The upstream digital repeater 36a digitizes and regenerates the high frequency upstream signals to yield substantially noise-free signals so long as the signal-to-noise ratio of the incoming subscriber-generated high frequency upstream signals is adequate which is typically the case. The regenerated upstream signals produced by the digital repeater 36a pass to a second upstream diplexer $39_1$ which, like the second downstream diplexer $39_2$, separates signals in the 750–1000 MHz frequency band from those in the 500–750 MHz band. The second upstream diplexer $39_1$ passes the high frequency subscriber-generated signals in the 750–1000 MHz band to the first upstream diplexer $38_1$, which, like the first downstream diplexer separates those signals in the 500–1000 MHz band from those lying in a frequency band of 5–500 MHz. The high frequency subscriber-generated signals lying in the 750–1000 MHz band received by the upstream diplexer $38_1$ are injected onto the upstream branch distribution cable segment 26, for ultimate transmission to the head end 12 of FIG. 2 via the fiber node 18 of FIG. 2.

Incoming downstream signals in the frequency band of 500–750 MHz that are received and separated by the first upstream diplexer $38_1$ pass on a cable segment $26_1$ to the second upstream diplexer $39_1$. The second upstream diplexer $39_1$ separates the downstream signals in the 500–750 MHz band and passes such downstream signals in this band to a downstream repeater $36_b$, similar to the upstream repeater $36_a$. The downstream repeater $36_b$ digitizes and regenerates the downstream information to yield a substantially noise-free signal so long as the signal-to-noise ratio of the downstream signals is adequate which is typically the case. The now-regenerated downstream signals pass to the second downstream diplexer $38_1$ for injection onto the downstream cable segment $26_2$.

The lower frequency signals (i.e., those in the 5–500 MHz frequency band) separated by the first upstream diplexer $38_1$ pass via a first coaxial cable $41_1$ to a first upstream diplexer $44_1$ in the amplifier assembly 37. The upstream diplexer separates signals in the 50–500 MHz band (representing the downstream signals that typically carry broadcast video) from signals in the 5–50 MHz band. The signals in the 5–50 MHz represent low frequency subscriber-generated information that is relatively noise-insensitive, and thus may be suitable for use without regeneration. The downstream signals in the 50–500 MHz band separated by the diplexer $44_1$ are amplified by an amplifier 45 and thereafter pass to a downstream diplexer $44_2$. Like the upstream diplexer $44_1$, the downstream diplexer $44_2$ in the amplifier element 37 separates signals in the 50–500 MHz band (e.g. the downstream broadcast video information) from the signals in the 5–50 MHz band (the low frequency subscriber generated information) The downstream signals in the 50–500 MHz band that are separated by the downstream diplexer $44_2$ pass via a second coaxial cable $41_2$ to the first downstream multiplexer $38_2$ in the regenerator element 35 for injection onto the downstream cable $26_2$.

Low frequency upstream signals (i.e., those lying in the 5–50 MHz. band) that are received by the downstream diplexer $38_2$ pass via the coaxial cable $41_2$ to the downstream diplexer $44_2$ and then to the amplifier 49. The low frequency upstream signals are amplified by an amplifier 49 and pass to the upstream diplexer $44_1$ for subsequent passage via the cable $41_1$ to the upstream diplexer $38_1$. The low frequency upstream signals lying in the 5–50 MHz band received by the upstream diplexer $38_1$ are injected onto the upstream cable segment $26_1$ for transmission to the head end 12 of FIG. 1.

The regenerator assembly 35 and amplifier assembly 37, in combination, serve to "quadraplex," that is, to separate into four constituent elements: (a) the high frequency subscriber-generated upstream signals lying in the 750–1000 MHz band; (b) the downstream information lying in the 500–750 MHz band; (c) the downstream information lying in the 50–500 MHz band; and (d) the low-frequency subscriber-generated upstream information lying in the 5–50 MHz band. To obtain increased bandwidth with reduced noise, the high frequency upstream signals lying in the 750 to 1000 MHz band, as well as the downstream signals lying in the 500–750 MHz band, are digitally regenerated via the repeaters 36a and 36b, respectively, within the regenerator assembly 35. In this way, the line extender 29 of the invention, comprised of the regenerator assembly 35 assembly and the amplifier assembly 37, provides increased upstream and downstream bandwidth with significant noise reduction. (Note that the prior art line extender 28 of FIG. 1 can be utilized to create the amplifier assembly 37, allowing for re-use of the line extender.) Moreover, the amplifier 29 can be readily substituted for the line extenders 28—28 relatively easily without the need for additional fiber.

Figure 4:
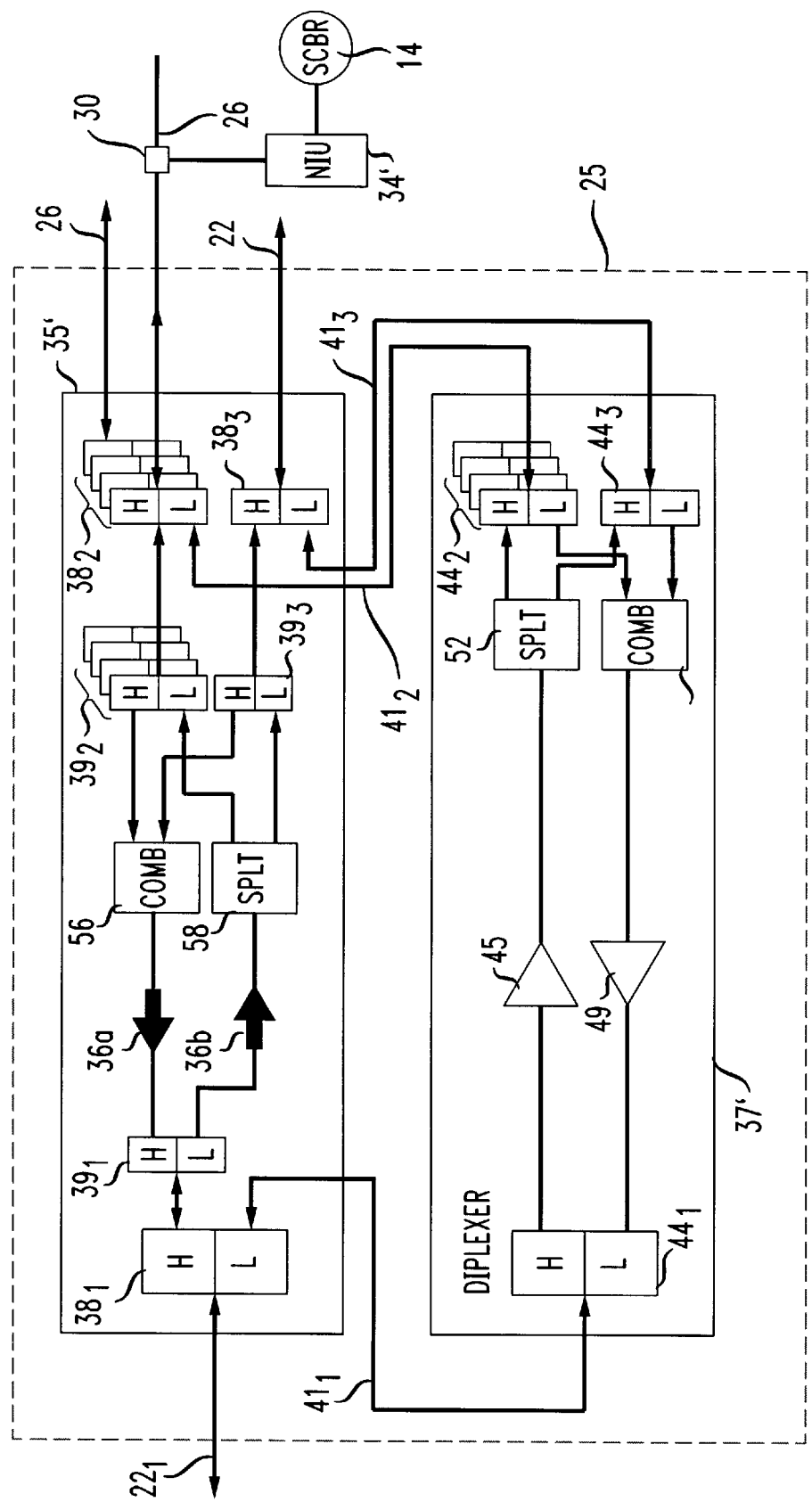
FIG. 4 is a block diagram of a trunk amplifier incorporating upstream and downstream digital repeaters in accordance with the present invention for use with the shared hybrid fiber-coax system of FIG. 2

Referring to FIG. 4, there is shown a block diagram of the trunk amplifier 25 of the invention for substitution in place of the trunk amplifier 24. The trunk amplifier 25 of FIG. 4 comprises a regenerator assembly 35' and an amplifier assembly 37' having elements in common with the regenerator 35 assembly and amplifier assembly 37, respectively, of the line extender 29 of FIG. 3. Therefore, like numbers have been used to reference like elements. (Note that the trunk amplifier 24 of FIG. 1 can be re-used as the amplifier assembly 37'.) However, the trunk amplifier 25 of FIG. 4 differs in several respects from the line extender 29 of FIG. 3 because the trunk amplifier 25 typically terminates multiple downstream cables.

As seen in FIG. 4, the regenerator assembly 35' within the tunk amplifier 25 comprises a first plurality of branch downstream branch diplexers $38_2$—$38_2$ and a first downstream trunk diplexer $38_3$. Each of the branch diplexers $38_2$—$38_2$ separates the signals on a separate one of the distribution cables 26—26 that are within the 500–1000 MHz band from the signals lying in a frequency band of 50–500 MHz. The lower frequency signals typically include the downstream information modulated onto the 50–500 MHz band as well as any subscriber-generated upstream information that is modulated onto the low frequency band of 5–50 MHz.

The signals lying in the 500–1000 MHz band separated by the first trunk diplexer $38_3$ pass to a second trunk diplexer $39_3$ that separates high frequency subscriber-generated signals in the 750–1000 MHz band from downstream signals in the 500–750 MHz band. By the same token, the high frequency subscriber-generated signals in 750–1000 MHz band separated by each of the branch diplexers $38_2$—$38_2$ passes to a separate one of a second plurality of branch diplexers $39_2$—$39_2$ that separates upstream signals in the 750–1000 MHz band from downstream signals in the 500–750 MHz band. A combiner 56 combines the upstream signals in the 750–1000 MHz band separated by the branch diplexers $39_2$—$39_2$ with the upstream signal in the 750–1000 MHz band separated by the trunk diplexer $39_3$.

The digital repeater 36a digitizes and regenerates the combined upstream signals in the 750–1000 MHz band received by the combiner 56. In this way, the repeater 36a will deliver substantially noise-free signals to upstream diplexer 39' which separates such signals in the 750–1000 MHz band from downstream signals in the 500–750 MHz band. The upstream signals in the 750–1000 MHz band separated by the upstream diplexer $39_1$ pass to the upstream diplexer 38, for injection onto the upstream branch coax trunk $22_i$.

As discussed, the upstream diplexer $38_1$ separates signals in the 500–1000 MHz band from those in the 5–500 MHz band. The downstream signals in the 500–750 MHz. band that are received by the diplexer $39_1$ from the diplexer $38_1$ are further separated. The downstream signals in the 500–750 MHz separated by the diplexer $39_1$ are digitized and regenerated by the downstream repeater 36b. A splitter 58 equally splits the downstream signals regenerated by the repeater 36b for distribution to each of the branch diplexers $39_2$—$39_2$ and to the trunk diplexer $39_3$. In turn, the branch diplexers $39_2$—$39_2$ pass such signals to the branch diplexers $38_2$—$38_2$ for injection onto the branch coax cables 26—26. In a similar manner, the trunk diplexer $39_3$ passes the now-regenerated downstream signals lying in the 500–750 MHz band to the trunk diplexer $38_3$ for injection onto the downstream trunk coax segment $22_2$.

The signals in the 5–500 MHz band separated by the upstream diplexer $38_1$ pass via a cable $41_1$ to the upstream diplexer $44_1$ within the amplifier assembly 37'. The upstream diplexer $44_1$ separates downstream signals in the 50–500 MHz band from upstream signals in the 5–50 MHz band. The downstream signals pass to an amplifier 45 for amplification prior to being split by a splitter 52 for distribution to each of a plurality downstream branch diplexers $44_2$—$44_2$ and a downstream trunk diplexer $44_3$.

Each of the branch diplexers $44_2$—$44_2$ is coupled via a separate one of cables $41_2$—$41_2$ to a separate one of the downstream branch diplexers $38_2$—$38_2$, respectively, within the regenerator assembly 35'. In this way, the downstream signals split by the splitter 52 passes from the diplexers $44_2$—$44_2$ for input to a corresponding one of the downstream diplexers $38_2$—$38_2$ and ultimate injection onto a separate one of the downstream branch distribution cables 26—26.

The coaxial cables $41_2$-$42_2$ also carry low frequency (5–40 MHz) upstream information, separated by each of the downstream diplexers $38_2$—$38_2$, to the downstream diplexers $44_2$—$44_2$, respectively, which separate such signals and pass them to a combiner 54 that combines the signals for passage to an amplifier 49 whose output is coupled to the upstream diplexer $44_1$. The upstream diplexer $44_1$ injects the low frequency signals upstream signals received from the amplifier 49 onto an upstream trunk cable segment $22_1$.

The downstream trunk diplexer $44_3$ receives a portion of the downstream signals in the frequency band 50–500 MHz split by the splitter 52 and passes such signals via a coaxial cable $41_3$ to the downstream trunk diplexer $38_3$ within the regenerator assembly 35'. The downstream trunk diplexer $38_3$ injects the downstream signals received via the cable $41_3$ onto a downstream trunk cable segment $22_2$. The downstream diplexer $38_3$ within the regenerator assembly 35' also serves to separate upstream signals in the low frequency band of 5–50 MHz on the downstream trunk coax segment $22_2$ and passes such signals via the cable $41_3$ to the downstream trunk diplexer $44_3$ within the amplifier assembly 37'. The downstream trunk diplexer $44_3$ in the amplifier assembly 37' passes the low frequency upstream signals in the 5–50 MHz band to the combiner 54 where such signals are combined with the low signals separated by the downstream branch diplexers $44_2$—$44_2$. As discussed, the combined signals are amplified by the amplifier 49 and are ultimately injected into the upstream branch coax segment $22_1$.

As may be appreciated, the trunk amplifier 25 of FIG. 4 operates to digitally regenerate both the upstream information modulated onto a high frequency band (750–1000 MHz) and the downstream information within the frequency band of 500–750 MHz.

The foregoing discloses a technique for achieving reliable digital transmission, reduced noise and increased upstream and downstream bandwidth in a shared hybrid-fiber coax transmission system. This advantages are accomplished by modulating at least a portion of the subscriber generated information into a high frequency band and then digitally regenerating such information to reduce the presence of ingress noise as well as digitally regenerating a portion of the downstream signals not used to provide broadcast video signals.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. For use with a shared hybrid-fiber coax transmission system that transmits downstream information within a first frequency band from a head end to individual subscribers on a main coax and which transmits upstream information generated by individual subscribers to a head end on the main coax, a method for increasing the bandwidth and reducing noise, comprising the steps of:

aggregating the upstream information onto the main coax digitally modulating at least a portion of the upstream information into a second frequency band above the downstream information;

digitally regenerating the upstream information; and digitally regenerating a portion of the downstream information lying in a frequency band immediately below the second frequency band.

2. The method according to claim 1 wherein the downstream information that is digitally regenerated lies in a frequency band of 500–750 MHz.

3. For use with a shared hybrid-fiber coax transmission system that transmits across a main coaxial cable downstream information within a first frequency band to individual subscribers and that transmits upstream information generated by individual subscribers, a method for increasing the bandwidth and reducing noise, comprising the steps of:

aggregating the upstream information onto the main coax digitally modulating at least a first portion of the upstream information via a carrier to a second frequency band above the first frequency band prior to transmission on the main coaxial cable;

separating the first portion of the upstream information from other information on the main coaxial cable;

digitally regenerating the upstream information;

re-injecting the upstream information onto the main coaxial cable;

separating a first portion of the downstream information of the main coaxial cable;

digitally regenerating the first portion of the downstream information; and re-injecting the downstream information onto the main coaxial cable.

4. The method according to claim 3 wherein said first portion of the upstream information is modulated into a frequency band of 750–1000 MHz and wherein the first portion of the downstream information lies in the frequency band of 500–750 MHz.

5. The method according to claim 3 wherein the upstream and downstream information is regenerated within at least one location within the hybrid fiber-coax system.

6. The method according to claim 3 wherein the upstream and downstream information is regenerated at multiple locations within the hybrid fiber-coax system.

* * * * *